United States Patent [19]

Parker et al.

[11] 4,455,220
[45] Jun. 19, 1984

[54] SEPARATION OF FLUID CRACKING CATALYST PARTICLES FROM GASEOUS HYDROCARBONS

[75] Inventors: Wesley A. Parker; Thomas S. Dewitz; George P. Hinds, Jr., all of Houston; John E. Gwyn, Katy; A. Haluk Bilgic, Houston; Donald E. Hardesty, La Porte, all of Tex.

[73] Assignee: Shell Oil Company, Houston, Tex.

[21] Appl. No.: 452,599

[22] Filed: Dec. 23, 1982

[51] Int. Cl.³ .............................................. C10G 11/18
[52] U.S. Cl. .................................... 208/161; 208/164; 55/459 R
[58] Field of Search ....................... 208/153, 161, 164; 55/394, 426, 459 R

[56] References Cited

U.S. PATENT DOCUMENTS

| | | | |
|---|---|---|---|
| 3,802,570 | 4/1974 | Dehne | 55/391 |
| 4,005,998 | 2/1977 | Gorman | 55/426 |
| 4,043,899 | 8/1977 | Anderson et al. | 208/113 |
| 4,173,527 | 11/1979 | Heffley | 208/153 |

Primary Examiner—Delbert E. Gantz
Assistant Examiner—Anthony McFarlane
Attorney, Agent, or Firm—John M. Duncan

[57] ABSTRACT

Catalyst and hydrocarbon vapors are separated in a cyclone zone attached to the discharge of a riser cracking operation. Vortex stabilizing means separating the cyclone zone from a stripping zone allows stripping gas from said stripping zone to be passed upwardly into said cyclone zone countercurrent to the downward flow of catalyst, thereby improving the separation and stripping of gaseous hydrocarbons from separated catalyst. The combined cyclone-stripping zone reduces catalyst hydrocarbon contact time, thereby improving gasoline yield and olefin content, decreasing gas make, and reducing coke deposits.

10 Claims, 4 Drawing Figures

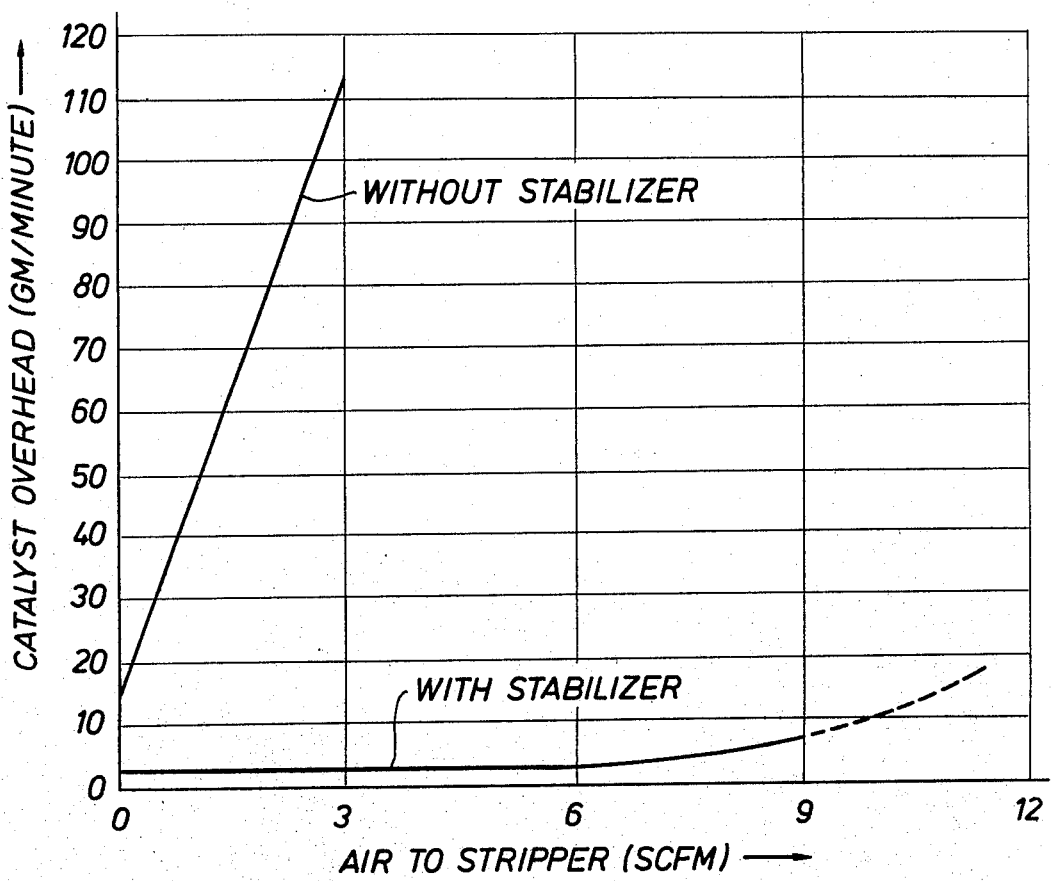
FIG.3 EFFECT OF GAS UPFLOW ON CYCLONE EFFICIENCY
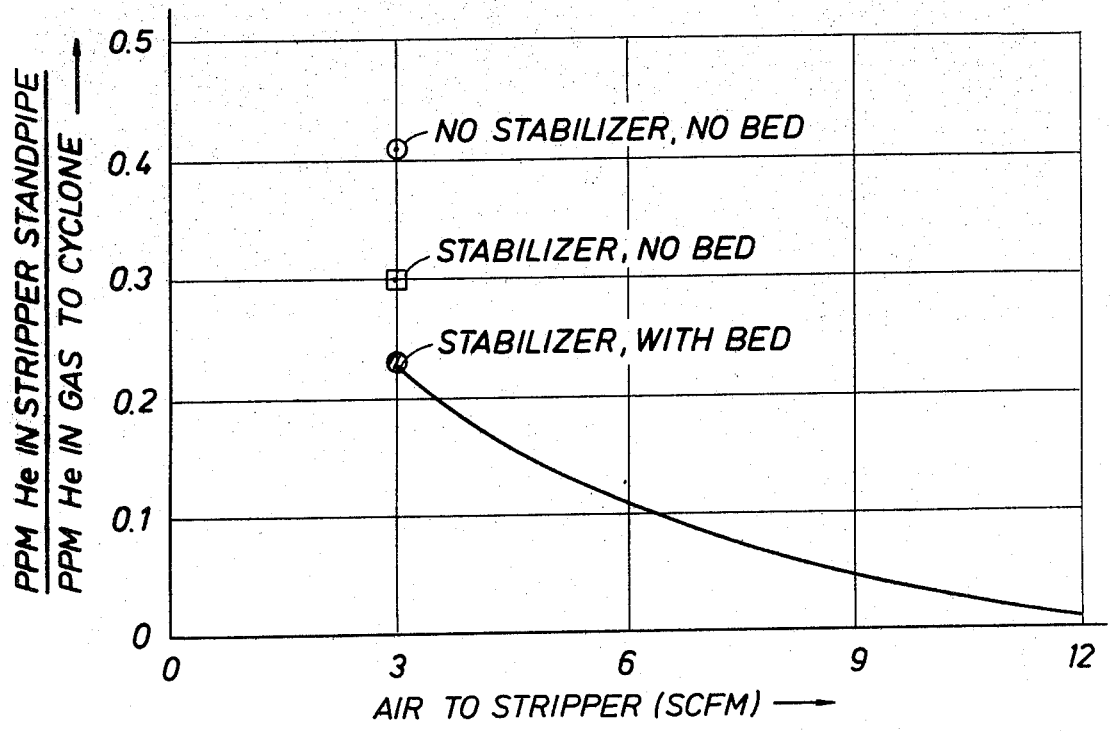
FIG.4 EFFECT OF STABILIZER AND BED ON PERFORMANCE OF STRIPPER CYCLONE

SEPARATION OF FLUID CRACKING CATALYST PARTICLES FROM GASEOUS HYDROCARBONS

BACKGROUND OF THE INVENTION

This invention relates to a process and apparatus for improving the separation of fluid cracking catalyst particles from gaseous hydrocarbons and stripping of hydrocarbons from the catalyst. More particularly, the invention is concerned with improving the separation of catalyst particles from gaseous hydrocarbon conversion products from a riser reactor in a catalytic cracking process and improving the stripping of hydrocarbons from the separated catalysts.

Dehne, U.S. Pat. No. 3,802,570 and Giles, U.S. Pat. No. 4,212,653 describe cyclone separators which include vortex stabilizing means for improving separation efficiency.

Anderson et al, U.S. Pat. No. 4,043,899 and Heffley et al, U.K. Pat. App. No. 2,013,530 A, describe cyclones which have been modified to include a separate cyclonic stripping of catalyst separated from hydrocarbon vapors from a riser cracker.

Dries, U.S. Pat. No. 4,313,910 describes an apparatus for separating a carrier gas from a particle stream from a riser reactor by deflecting the particle stream about a curved surface and introducing a fluid such as steam to rapidly disengage hydrocarbons from the catalyst particles.

The use of zeolite cracking catalysts, requiring short, fixed reaction times, has substantially affected catalytic cracking process design during the last few years. Modern catalytic cracking technology uses riser reactors, with rapid solid-vapor disengaging at the riser exit. In this process, the traditional reactor vessel has been relegated to the role of solids disengaging (i.e., gravity settler). Several designs are commercially available to treat the unique reaction engineering problems associated with fast-fluidized riser reactors. Numerous problems, regarding vapor/catalyst disengaging, remain to be solved. Several methods and means for solving these problems are proposed in the above-described patents which are incorporated herein by reference. However, none of the above describe the present invention.

The benefits of good feed/catalyst contacting include greater gasoline yield, a less pronounced catalyst density gradient (radially), faster feed vaporization, lower gas mix, and generally improved operability. As "ultimate" yields in zeolitic cracking are approached, engineering and hardware limitations will most certainly govern operations and the cracking reaction scheme itself.

Effectively terminating cracking reactions at the riser exit to accrue benefits of increased gasoline make, decreased gas make, and a more olefinic product requires stripping of interstitial and adsorbed hydrocarbons in the vapor/solids disengaging device. Increased gasoline yields result from a reduction in excessive secondary reactions, which occur if the hydrocarbons remain in contact with the catalyst beyond a desirably short reaction time. Those catalytic cracking units with gas compressor throughput capacity limitations will immediately benefit from the reduced gas production resulting from rapid vapor/catalyst disengaging and quick stripping of interstitial hydrocarbon. Reduced amounts of entrained and adsorbed hydrocarbons going into the regenerator will benefit units which are "coke" burning limited.

The hydrocarbons which must be separated from the catalyst include the bulk product vapor, the interstitial vapor, and the adsorbed products. The bulk product vapor is that which is separated, quickly and easily, by mechanical means (cyclones). The interstitial vapor can be displaced, relatively rapidly, by "stripping" gas, preferably steam. The adsorbed product requires a longer time to desorb and requires additional steam stripping. It is an object of this invention to provide mechanical disengaging/quick stripping to separate the bulk and interstitial vapors from the cracking catalyst as rapidly as possible. This minimizes overcracking and reduces the amount of carbon deposited on the catalyst. It is a further object of this invention to provide additional stripping to remove adsorbed products as rapidly as possible.

Heretofore, the introduction of stripping gas into a cyclone separator resulted in a loss of separation efficiency and was impractical.

It has now been found that when vortex stabilizing means are incorporated in a cyclone separator, stripping gas can be added to the cyclone separation zone without substantial loss of efficiency. Consequently, the cyclone separator and downstream stripper may be combined to achieve the concomitant benefits of quick stripping to remove bulk product vapor and interstitial vapor and to provide the longer stripping time required to desorb adsorbed hydrocarbon products from the catalyst.

SUMMARY OF THE INVENTION

The present invention provides a method and apparatus for separating fluid cracking catalyst particles from hydrocarbon conversion products and stripping gases therefrom which comprises passing a suspension of said catalyst particles and gaseous hydrocarbons upwardly through a riser conversion zone in a fluid catalytic cracking process under elevated temperature conversion conditions; passing said suspension from said riser conversion zone into the upper portion of a separator vessel containing a cyclonic swirl zone wherein a fluid vortex is formed from which a cyclonic separation is made between catalyst particles and gaseous hydrocarbon conversion products in said cyclone zone; centering the tip of said fluid vortex by contact with vortex stabilizing means having a diameter of about one vortex outlet diameter or greater and being coaxially located at the bottom of said separation zone; defining the length of said separation zone by spacing said stabilizing means at least about two vortex outlet diameters below the bottom of said vortex outlet, which comprises an open ended vertical coaxial passageway extending from the upper portion of the separator vessel downwardly through said swirl zone to the top of said cyclone zone; removing separated gaseous hydrocarbon conversion products from the upper portion of the cyclone zone through said vortex outlet; passing separated catalyst through an annulus formed by the perimeter of said stabilizing means and the separator wall into a lower stripping zone which is in gaseous communication with the cyclone zone, said annulus being sufficiently wide to permit catalyst passage downwardly and stripping gas passage upwardly; contacting said catalyst with from about 1 to 4 pounds of stripping gas per 1,000 pounds of catalyst as it passes downwardly through said annulus and a stripping zone to a catalyst bed, the length of said stripping zone being defined as the distance from the stripping gas/catalyst bed contact zone to said stabilizer means, said distance being sufficient to provide disengaging height between the top of said catalyst bed and the bottom of said stabilizing means so as to avoid slugs of catalyst carryover into said cyclone zone.

BRIEF DESCRIPTION OF DRAWING

FIG. 3 is a graph which shows the effect of gas upflow on cyclone efficiency with and without stabilizer means.

FIG. 4 is a graph which shows the effect of the vortex stabilizer and catalyst bed depth on stripper cyclone performance at various gas stripping rates.

DETAILED DESCRIPTION

Figure 1:
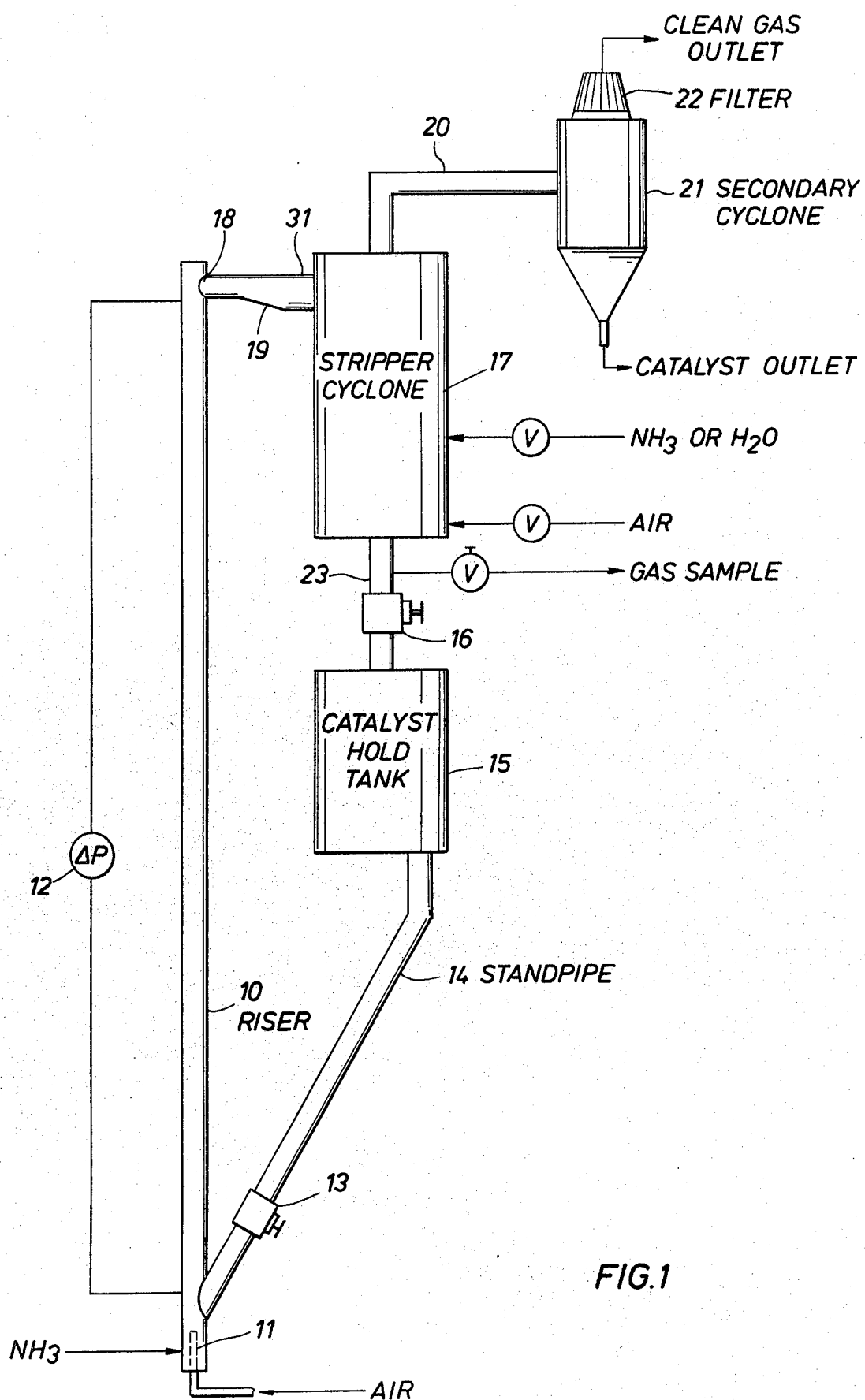
FIG. 1 is a diagrammatic elevation of a test loop adapted to be used in accordance with the invention.

Cyclones are particularly useful at high temperatures and pressures because they are simple in construction, have no moving parts, have large capacities, and are not sensitive to the chemical nature of the gas or solid. On the other hand, cyclones require high internal velocities to separate small particles efficiently. The high velocities in cyclones cause erosion, attrition, noise, and structural vibration. The errosion problem in particular becomes very costly when an FCC unit must be shut down prematurely for cyclone repairs.

A cyclone separator uses the centrifugal forces in a confined, high velocity vortex to separate phases of different densities. The strength and stability of the vortex are of primary importance in determining both separation efficiency and erosion resistance of a cyclone. Since improved cyclone reliability, separation performance, and erosion resistance are extremely important commercial objectives, studies were undertaken to achieve cyclone modifications which will reduce erosion and improve efficiency. In particular, studies were made of cyclone internals which contained means for stabilizing the vortex. By "stabilized", we mean that the vortex was held in the center of the cyclone and that the turbulent energy dissipation was reduced.

Numerous cyclone flow, velocity, accoustical, and pressure drop experiments were performed at near ambient conditions. Most of these experiments were done with an 18 inch diameter, tangential inlet cyclone which was a 0.31 scale PLEXIGLAS ® model of a second stage FCC commercial cyclone. The scale of the model was chosen to simulate the Reynolds and Strouhal numbers of the actual FCC cyclone at a similar inlet velocity (25 m/sec). The model was tested with and without vortex stabilizers of various configurations. Wall roughness was simulated by a 10 mesh, 0.11 cm "thick" wire screen closely fitted to the inside walls of the cyclone. This model is typical of cyclones used in modern catalytic cracking units, except that it is a particularly high efficiency design. The distinguishing features of such a design are a large inlet to outlet area ratio, narrow inlet, and long cyclone body.

Many variations of the basic cyclone were tested to determine the effects of hopper geometry, stabilizer geometry, and wall roughness on the vortex motion in cyclones.

All experiments used air (to simulate gaseous hydrocarbons) as the main flow. The air was supplied by three 400 horsepower blowers, each with the capacity of one standard m$^3$/sec (2100 ACFM). Most of the experiments were done with about 0.6 m$^3$/sec at 117 kPa (17 psia). This flow rate corresponds to an inlet velocity of 17 m/sec. At this flow rate, the Reynolds number based on the outlet tube diameter ($Re_z = \rho_g w_i r_i / \mu$) was approximately $2.8 \times 10^5$. At such a high Reynolds number the velocity profiles are essentially independent of the flow rate, therefore, the actual flow rate was allowed to vary somewhat, but all measurements were taken at flow rates above 0.5 m$^3$/sec at 110–130 kPa, 16°–29° C. (16–19 psia, 60°–85° F.). For purposes of comparison, the velocity profiles were all adjusted to an inlet velocity of 17 m/sec.

Cyclones are characterized by large radial pressure gradients which balance the centrifugal forces in the swirling flow. Therefore, there is a relative vacuum at the center, or core, of the vortex. This low pressure core would presumably "suck" on any nearby surface, thus stabilizing an attachment of the vortex to that surface.

Vortex stabilizer means were placed in the model cyclone to forestall the unsteady motion of the vortex.

A vertical pin or vortex finder may be added to the stabilizer to restrict and center the lateral motion of the vortex. It was found that a 0.6 cm diameter stabilizer pin was insufficient to restrict the vortex motion in the test cyclone. The vortex stabilizer was more effective when a larger pin was used to center the vortex. A 1.9 cm diameter rod was tested with better results.

Several types of vortex stabilizer means were tested with varying results. Generally, a flat plate or circular disk was found to be satisfactory. The vortex stabilizer means diameter should be at least about one vortex outlet tube diameter. The maximum stabilizer diameter in a commercial model is set primarily by weight limitations and is limited only by providing an annulus between the perimeter of the stabilizer and the vessel wall large enough to permit catalyst to flow downwardly while simultaneously passing stripping gas in an upwardly direction.

The vortex finder is not critical to cyclone performance provided the vortex stabilizer means are located a short distance from the vortex outlet, i.e., at least about 2–3 vortex outlet tube diameters. However, if the vortex finder is located at a greater distance, say 5–8 vortex outlet tube diameters, then it is preferred that the vortex stabilizer means contain a vortex finder. Preferably such a vortex finder would be greater than about one third the vortex length.

Based on aerodynamic studies, vortex stabilization appears desirable for increasing separation efficiency while minimizing both pressure loss and erosion. Vortex stabilizers reduced the pressure drop across the model cyclone by 10–15% even though the peak swirl velocities were significantly increased. This behavior is exceptional in cyclones since increasing swirl almost always raises the pressure loss. As the pressure drop goes down, vortex stabilization seems to reduce the turbulent energy dissipation in cyclones.

These studies led to the discovery that when a suitable vortex stabilizer is present in a cyclone, a fluidized bed stripping section can be added to the cyclone. In the apparatus of the invention stripping gas flows upwardly counterflow to the downward flow of catalyst without affecting the efficiency of the cyclone separator. Without the vortex stabilizer means even small amounts of stripping gas into the bottom of the cyclone separator disrupted the vortex and rapidly destroyed its efficiency. These findings were verified in a laboratory test loop which is discussed below.

There is a fundamental difference between the stabilizer disk and a vertical tube as internals in the cyclone/stripper. The stabilizer disk centers the vortex in the upper cyclone section and decouples it from the stripping section below. Steam from the stripping section must sweep around the disk, displacing the hydrocarbon vapor from that region. However, the steam may entrain catalyst if the velocity through the annular space around the disk gets too high. But "too high" is at least 10 ft/sec and probably higher.

The vertical tube, as used in Mobil's U.S. Pat. No. 4,043,899, couples the vortices of the upper cyclone with those of the stripper section. The central opening is essential to the Mobil design but allows catalyst to be entrained from the stripping section up the vortex of the cyclone. Much lower steam velocities are required to entrain fluidized catalyst up the central tube than would be required to entrain catalyst from the wall.

Therefore, the Mobil design is unsuitable for incorporating a fluidized bed stripper in the bottom of the vessel. The upflow of steam would disrupt the cyclonic motion in both the tangential stripper section that Mobil uses and in the cyclone proper, above. Unacceptable catalyst carryover would result.

A test loop was constructed of PLEXIGLAS® as shown in FIG. 1. Catalyst enters the bottom of a $3'' \times 14'$ riser 10 and is transported by air which enters through a concentric $1\frac{1}{2}''$ nozzle 11. The differential pressure ($\Delta P$) 12 across the riser was not measured precisely, but was on the order of $1''$ of $H_2O$. Air flow rates of 64 to 103 SCFM were used in the riser 10. These rates correspond to superficial velocities in the riser of 22 to 35 ft/sec (4.9 to 7.9 lbs/minute of air). Measurement of air rate was via rotometer. Catalyst flow rates in the riser were varied from 4.6 to 20 lbs/minute. Control of solids flow rate was by setting a pinch clamp 13 in a $3''$ dia. standpipe 14 between the catalyst hold tank 15 and the riser 10. The catalyst rate was measured by closing a pinch clamp 16 between the stripper cyclone 17 and the catalyst hold tank 15 and measuring the rate of level increase in the stripper cyclone body. For this measurement air was turned off to the stripper cyclone 17 and a catalyst density of 50 lbs/ft$^3$ was assumed.

At the top of the riser 10 there is a right angle turn 18 and a transition 19 from a $3''$ pipe (7.07 sq. inch) to a $6''$ high $\times 1\frac{1}{2}''$ wide rectangular tangential cyclone inlet 31 (9 sq. inch). Gas velocities at the cyclone inlet were varied from 17 to 27.5 ft/second.

Gas exits from the stripper cyclone 17 via a $3''$ ID pipe 20. A secondary cyclone 21 collects the catalyst from the stripper cyclone overhead. A paper filter 22 allows clean gas to pass to the atomsphere and catches catalyst which escapes from the secondary cyclone.

Catalyst exits from the stripper cyclone 17 through a standpipe 23. A pinch clamp 16 is used to control the catalyst level in the bottom of the stripper cyclone 17. A catalyst hold tank 15 below the stripper cyclone 17 provides a reservoir which feeds the riser through a $3''$ standpipe 14.

Figure 2:
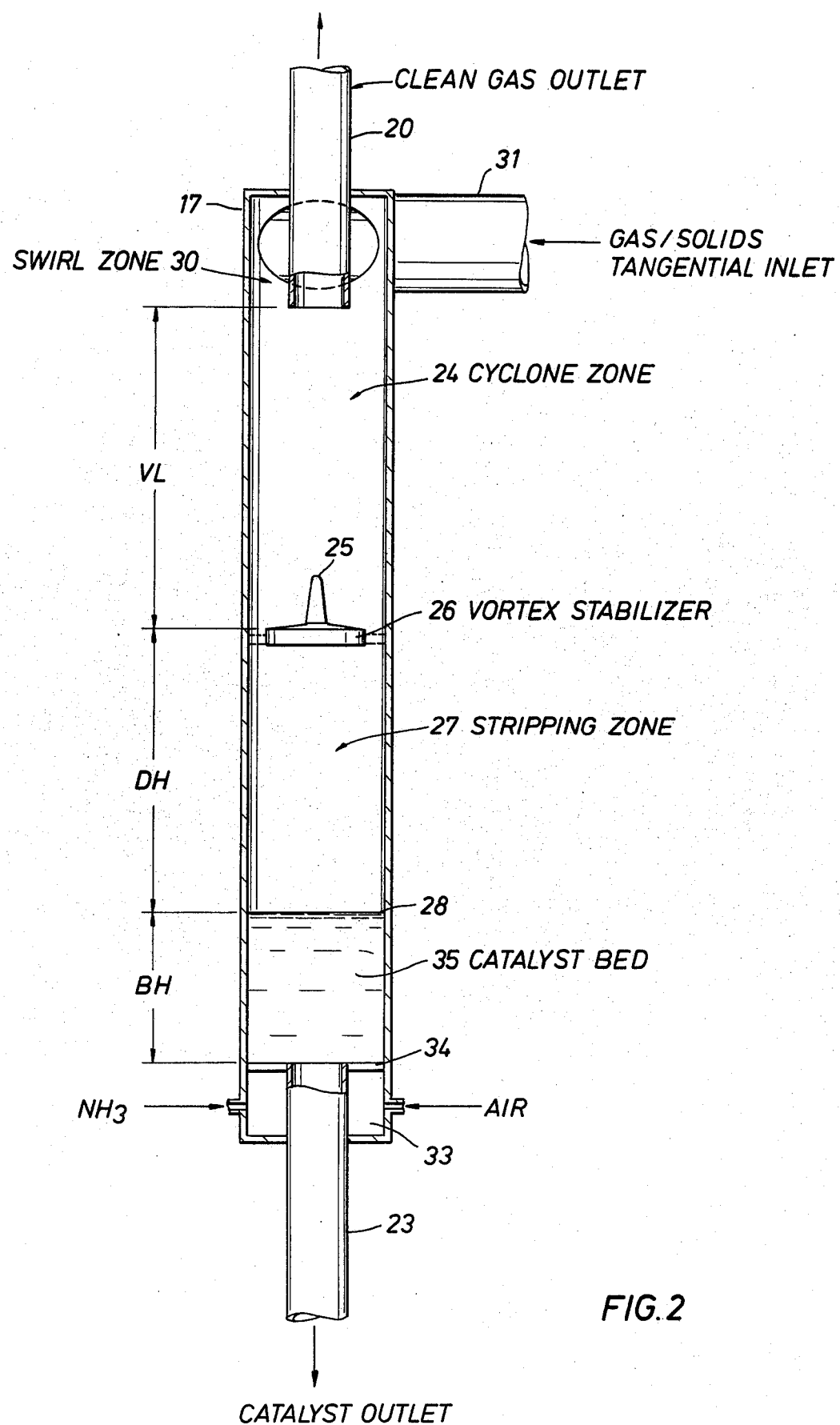
FIG. 2 is a diagrammatic elevation of a stripper cyclone according to the invention.

A detailed diagrammatic elevation view of the stripper cyclone 17 is shown in FIG. 2. The cyclone zone 24 was made from a 6 inch ID pipe and contained a vortex finder 25 and a vortex stabilizer 26 located a suitable distance (6–18 inches) from the bottom of the clean gas outlet pipe 20. This distance defines the vortex length, VL. Below the vortex stabilizer 26 and stripping zone 27, a catalyst bed level 28 was maintained. The stripping zone 27 was also made from a 6 inch ID pipe. The clean gas outlet 20 was a 3 inch ID pipe with $\frac{1}{8}''$ wall thickness and extended 7 inches through the swirl-inducing zone 30 to the top of the cyclone zone 24. The catalyst outlet 23 was 3 inch ID pipe.

The vortex stabilizer 26 was 4 inches in diameter (for most of the tests), $\frac{1}{2}$ inch thick at the edge and 1 inch thick in the center. The vortex finder 25 was $2\frac{1}{2}$ inches long, $\frac{1}{2}$ inch diameter at the base and $\frac{1}{4}$ inch diameter at the top. Air and ammonia or water were injected through an annular plenum 33 and a sintered stainless steel ring 34 into the bottom of the catalyst bed 35. The ammonia or water were added to minimize static electricity in the apparatus.

Bed height (BH), disengaging height (DH) and vortex length (VL) were all varied during the tests.

The overall efficiency of the stripper cyclone 17 was measured by weighing the underflow from the secondary cyclone 21 (FIG. 1). This was not rigorously correct because the fines collected on the paper filter at the top of the secondary cyclone were not measured. However, the error was small. After several measurements of efficiency, the amount of fines on the filter was trivial compared to the amount of catalyst collected from the secondary cyclone underflow during any single measurement of efficiency.

The invention will now be illustrated with reference to the following Examples, which are intended to be a complete specific embodiment of the invention and are not intended to be regarded as a limitation thereof.

EXAMPLE 1

A series of tests was undertaken using the test loop and stripper cyclone shown in FIGS. 1 and 2 and described above. Commercial fluid catalytic cracking catalyst was used as the solid and air was used as both transport gas (simulating gaseous hydrocarbons) and as stripping gas (simulating steam). The vortex stabilizer for this test series was a $4''$ diameter disk, $\frac{1}{2}$-inch thick at the edge and 1-inch thick at the center. A vortex finder, $2\frac{1}{2}$ inches long $\times \frac{1}{2}$-inch diameter at the base $\times \frac{1}{4}$-inch diameter at the top, was mounted at the center of the stabilizer plate.

Tests of stripper cyclone efficiency were made with and without the vortex stabilizer. Without the stabilizer, introducing air to the stripper caused a considerable increase in solids loss in the stripper cyclone overflow. With the stabilizer in place considerable air can be introduced to the stripper with only a minor effect on the rate of catalyst loss in the stripper cyclone overflow. The data from these tests are plotted in FIG. 3 and the test results are given in Table 1. The air rate to the stripper depends upon catalyst circulation rate and cyclone (bed) cross sectional area. However, to put the rates in perspective, 6 SCFM air to the stripper results in a bed superficial velocity of 0.5 ft/sec. For a commercial unit with, say, 40 tons per minute catalyst circulation and a 15 ft cyclone diameter, 0.5 ft/sec corresponds to 2.9 lbs of stripping steam/1000 lbs of catalyst in a 950° F., 20 psig situation. Thus the air rates used in this test are close to the steam rates required for reasonable stripping.

These tests show that with a vortex stabilizer, an upflowing gas superficial velocity of 0.5–0.62 ft/sec (6 to 9.5 SCFM) does not cause any appreciable deterioration in separation efficiency. Superficial velocities of up to about 0.9 ft/sec (about 11 SCFM) can be tolerated without much loss in separation efficiency.

TABLE 1
STRIPPER CYCLONE COLLECTION EFFICIENCY

| Test No. | SCFM Air Riser | SCFM Air Stripper | Cat Flow, lbs/min | VL, in. | DH, in. | Bed Ht., in. | Cat. Overhead, Gm/Min |
|---|---|---|---|---|---|---|---|
| 1 | 95.2 | 0 | 14.6 | 11 | 18 | 6 | 4.1 |
| 2 | " | 3 | " | " | " | " | 3.8 |
| 3 | " | 6 | " | " | " | " | 4.3 |
| 4 | " | 7.5 | " | " | " | " | 4.0 |
| 5 | " | 9 | " | " | " | " | 15.0 |
| 6 | 87.7 | 0 | 14.4 | 11 | 18 | 6 | 3.5 |
| 7 | " | 6 | " | " | 18 | 6 | 3.4 |
| 8 | " | 9 | " | " | 18 | 6 | 7.9 |
| 9 | " | 11 | " | " | 18 | 6 | 20.1 |
| 10 | " | 6 | " | " | 18 | 6 | 4.1 |
| 11 | " | 6 | " | " | 10 | 14 | 4.8 |
| 12 | 95.2 | 0 | 23.0 | 11 | 18 | 6 | 13.7 |
| 13 | " | 0 | 13.0 | " | 18 | 6 | 3.2 |
| 14 | " | 6 | 13.0 | " | 10 | 14 | 3.7 |
| 15 | " | 7.5 | 13.0 | " | 10 | 14 | 5.6 |
| 16 | " | 9 | 13.0 | " | 10 | 14 | 10.4 |
| 17 | 95.2 | 0 | 13.6 | * | 25 | 10 | 13.3 |
| 18 | " | 0 | " | * | 25 | 10 | 15.8 |
| 19 | " | 3 | " | * | 25 | 10 | 113.7 |
| 20 | 90.4 | 0 | 17.3 | 7 | 18 | 10 | 3.1 |
| 21 | " | 6 | " | " | 14 | 14 | 4.1 |
| 22 | " | 0 | " | " | 18 | 10 | 3.2 |
| 23 | " | 9 | " | " | 14 | 14 | 7.4 |
| 24 | " | 3 | " | " | 14 | 14 | 2.5 |
| 25 | " | 7.5 | " | " | 14 | 14 | 5.6 |
| 26 | " | 11 | " | " | 14 | 14 | 25.3 |
| 27 | " | 0 | " | " | 18 | 10 | 4.2 |
| 28 | " | 0 | " | " | 18 | 10 | 2.6 |
| 29 | " | 6 | " | " | 10 | 18 | 3.2 |
| 30 | " | 11 | " | " | 15 | 13 | 11.3 |

*No vortex stabilizer.

EXAMPLE 2

Another series of tests was made in the test loop and stripper cyclone described in Example 1 using a vortex length of 11 inches, a solids flow rate of 15.5 pounds per minute through the riser along with 88.5 SCFM of air.

This series of tests involved injecting helium into the riser gas and measuring the helium concentration in the gas exiting with the catalyst. The sampling point was from unaerated catalyst in the stripper standpipe. Assuming a bulk density of 40 lbs/ft$^3$ for catalyst in the standpipe, gas flow down the stripper standpipe would be about 0.5 SCFM. The tests, as shown in FIG. 4, indicate that by introducing air to the stripper riser, gas was effectively excluded from the stripper standpipe. At 6 SCFM air to the stripper, bed height in the stripper had little effect on the exclusion of riser gas from the stripper standpipe. In fact, even without a vortex stabilizer, little of the riser gas found its way to the stripper standpipe.

These helium tracer studies show that a very small percentage of gas contained in the riser reaches the stripper cyclone standpipe when a suitable amount of stripping gas is added to the stripper cyclone of the invention which contains stabilizer means, a catalyst bed and suitable disengaging height (DH). The latter ranged from 10-18 inches for these tests and no appreciable difference in efficiency was noted.

EXAMPLE 3

Another series of tests was made using the test loop and stripper cyclone of Example 1 wherein the vortex stabilizer dimensions were varied. For this series of tests the conditions were as follows: 6" diameter cyclone, 7" vortex length, 12.5" Disengaging Height, 7.5" Bed Height, 3" diameter gas outlet tube, 1" diameter catalyst underflow tube, 90.9 SCFM Air and ~20 lbs/min catalyst to cyclone inlet, vortex stabilizer pin=2.5".

Table 2 contains data on cyclone collection efficiencies for several different vortex stabilizer diameters. The grams per minute of catalyst which escapes the cyclone as overflow was measured for each stabilizer plate diameter. With no stabilizer (zero plate diameter) introducing even a small amount of upflowing air caused a major loss of efficiency. A three inch diameter plate provided some improvement while a four inch diameter plate provided significant improvement. The 4½ inch and 5 inch plates provided further but less dramatic improvement. In scaling up the design from test loop to commercial size, the pertinent factor is the ratio between the vortex outlet tube diameter (clean gas outlet) and the stabilizer plate diameter. In the test cyclone, the vortex outlet tube diameter was three inches. Taking the 4½ inch diameter plate as an acceptable compromise between efficiency and stabilizer weight, the ratio between plate diameter and vortex tube diameter should be about 1.5.

Similar tests were made to determine the effect of vortex stabilizer pin length. Little effect was noted and a pin length of about one-third the vortex length seems adequate.

EXAMPLE 4

Another type of vortex stabilizer was tested using the test loop and stripper cyclone of Example 1. The conditions were the same as those for Example 3, except that a 4-inch diameter vortex stabilizer plate with a 1-inch diameter vortex finder pin was used and the plate and pin had an axial hole through them. Two hole sizes were tested (⅜" and ⅝" dia.) and the results are shown in Table 3.

In vortex stabilizers containing an axial hole a gas upflow exists through the hole due to the pressure differential created by vortex flow in the cyclone. Process gas laden with solid particulates enters the swirl zone through a tangential inlet. Primary separation of solids and gas takes place by centrifugal action in the upper cyclonic section of the device above the vortex stabilizer. Most of the incoming gas thus separated from particulates is removed through the gas outlet. A small portion of the process gas is allowed to flow co-currently with the solids which travel down through the annulus between the body of the cyclone and the vortex stabilizer in their natural, unrestricted helical pattern. Most of the entrained gas is separated from the solids in the stripping zone below the vortex stabilizer by virtue of the pressure differential existing across the axial hole and is returned to the gas outlet through the core of the cyclone.

Solid particulates fall downwardly through the stripping zone into a bubbling dense bed where the removal of process gas is completed by stripping the solids with an inert gas. Stripping gas flows upwardly through the axial hole to the low pressure core of the vortex and to the gas outlet together with stripped and entrained portions of process vapor.

High solids removal efficiency is obtained in the device by providing the above mentioned small but positive co-current downflow of process gas with the solids in the annulus between the stabilizer and the cyclone vessel wall. The amount of gas downflow through the annulus is kept as small as practical by proper design to reduce the inward radial velocity of the gas as it separates from the solids in the lower section to avoid re-entrainment of solids through the axial hole. A sufficiently large disengaging height is provided above the dense bed to prevent entrainment from the dense bed and to further minimize the radial velocity. Excessive amounts of gas downflow also increases the effective residence time in the cyclone and is to be avoided where this is undesirable. The performance of the cyclone can be tailored to desired objectives by proper choice of cyclone, and in particular, axial hole dimensions.

Peripheral removal of solids from the primary separation chamber at high velocities with co-current gas flow avoids flow problems encountered in discharge of sticky solids through conventional cyclone dip-legs and permit high solids discharge rates without plugging problems through cyclones of relatively small dimension having low gas residence times.

TABLE 2

EFFECT OF VORTEX STABILIZER ON STRIPPER CYCLONE COLLECTION EFFICIENCY

| Comparison No. | Air To Stripper, SCFM (Upflowing Air) | Catalyst in Stripper Cyclone Overflow, Grams/Minute | | | | |
|---|---|---|---|---|---|---|
| | | No Stabilizer | 3" Dia Plate | 4" Dia Plate | 4½" Dia Plate | 5" Dia Plate |
| 1 | 0 | 0.97 | — | — | — | — |
| 2 | 2 | 7.9 | — | — | — | — |
| 3 | 3 | 20.4 | 0.36 | 0.17 | 0.16 | 0.11 |
| 4 | 6 | — | 3.34 | 0.25 | 0.17 | 0.11 |
| 5 | 7.5 | — | — | 0.20 | — | — |
| 6 | 9 | — | 44.6 | 0.45 | 0.35 | 0.14 |
| 7 | 10.5 | — | — | 6.1 | 1.9 | 0.77 |
| 8 | 11.25 | — | — | — | — | 5.5 |
| 9 | 12 | — | — | — | — | 65.8 |

TABLE 3

EFFECT OF VORTEX STABILIZER ON STRIPPER CYCLONE COLLECTION EFFICIENCY

| Comparison No. | Air To Stripper, SCFM (Upflowing Air) | Catalyst in Stripper Cyclone Overflow, Grams/Minute | | |
|---|---|---|---|---|
| | | No Stabilizer | ⅞" Dia* Hole | ⅝" Dia* Hole |
| 1 | 0 | 0.97 | 2.6 | — |
| 2 | 2 | 7.9 | 9.5 | 13.0 |
| 3 | 3 | 20.4 | — | — |
| 4 | 6 | — | 18.6 | 43.5 |
| 5 | 7.5 | — | 19.6 | — |
| 6 | 9 | — | 21.9 | — |
| 7 | 10.5 | — | 26.9 | — |

*4" diameter plate, 1" diameter pin, hole through pin and plate.

Other embodiments of the invention will be apparent to those skilled in the art from a consideration of this specification or from practice of the invention disclosed herein. It is intended that the specification and examples be considered as exemplary only, with the true scope and spirit of the invention being indicated by the following claims.

What is claimed is:

1. A method for separating fluid cracking catalyst particles from hydrocarbon conversion products and stripping interstitial and adsorbed hydrocarbon gases therefrom which comprises passing a suspension of catalyst and gaseous hydrocarbons upwardly through a riser conversion zone in a fluid catalytic cracking process under elevated temperature conversion conditions; passing said suspension from said riser conversion zone into the upper portion of a separator-stripper vessel containing a gas/solids tangential inlet, a swirl zone, a cyclone zone, a vortex outlet, vortex stabilizing means, a catalyst disengaging space and a fluidized bed of catalyst; forming a fluid vortex in said swirl and cyclone zones from which a cyclonic separation is made between catalyst particles and gaseous hydrocarbon conversion products; centering the tip of said fluid vortex by contact with said vortex stabilizing means having a diameter of about one vortex outlet diameter or greater and being coaxially located at the bottom of said cyclone separation zone; defining the length of said cyclone separation zone by spacing said stabilizing means at least about two vortex outlet diameters below the bottom of said vortex outlet, which comprises an open ended vertical coaxial passageway extending from the upper portion of the separator vessel downwardly through said swirl zone to the top of said cyclone zone; removing separated gaseous hydrocarbon conversion products from the upper portion of the cyclone zone through said vortex outlet; passing separated catalyst through an annulus formed by the perimeter of said stabilizing means and the separator wall into a lower stripping zone which is in gaseous communication with the cyclone zone, said annulus being sufficiently wide to permit catalyst passage downwardly while simultaneously passing stripping gas in an upwardly direction; contacting said catalyst with from about 1 to 4 pounds of stripping gas per 1000 pounds of catalyst as it passes downwardly through said annulus and a stripping zone, which includes a catalyst disengaging space, to the fluidized catalyst bed contained within said separator-stripper vessel, the length of said stripping zone being defined as the distance from the stripping gas/catalyst bed contact zone to said vortex stabilizer means, said distance being sufficient to provide disengaging height between the top of said fluidized catalyst bed and the bottom of said stabilizing means so as to avoid slugs of catalyst carryover into said cyclone zone.

2. The method of claim 1 wherein the vortex stabilizing means comprises a solid disk or plate.

3. The method of claim 2 wherein the stabilizer means has attached to the center thereof and extending upwardly into the cyclone zone a vortex finder rod.

4. The method of claim 3 wherein the length of said vortex finder rod is at least one-third the vortex length.

5. The method of claim 1 wherein the vortex stabilizer means includes an open axial passageway through which gas flows from the stripping zone to the core of said vortex in the cyclone zone.

6. The method of claim 5 wherein the stabilizer means comprises a solid disk or plate.

7. The method of claim 6 wherein the stabilizer means has attached thereto an axial upwardly extending vortex finder rod.

8. The method of claim 7 wherein the length of said vortex finder rod is at least one third the vortex length.

9. The method of claim 1 wherein the stripping gas superficial velocity ranges from about 0.2 to about 0.9 feet per second.

10. The method of claim 9 wherein the stripping gas is steam.

* * * * *